United States Patent [19]
Stahl

[11] Patent Number: 5,857,812
[45] Date of Patent: Jan. 12, 1999

[54] PROCESS AND DEVICE FOR DETECTING AND COMPENSATING FOR JOINTING AND WEAR ERRORS IN FINE DRILLING

[75] Inventor: Frank Stahl, Pleidelsheim, Germany

[73] Assignee: Komet Praezisionswerkzeuge Robert Breuning GmbH, Besigheim, Germany

[21] Appl. No.: 809,196

[22] PCT Filed: Jul. 8, 1995

[86] PCT No.: PCT/EP95/02661

§ 371 Date: May 7, 1997

§ 102(e) Date: May 7, 1997

[87] PCT Pub. No.: WO96/07500

PCT Pub. Date: Mar. 14, 1996

[30] Foreign Application Priority Data

Sep. 7, 1994 [DE] Germany .......................... 44 31 845.6

[51] Int. Cl.⁶ .................................................. B23B 35/00
[52] U.S. Cl. ............................... 408/1 R; 33/634; 408/6; 408/8; 408/13
[58] Field of Search ................................. 408/6, 8, 9, 13, 408/1 R, 16; 33/634, 637, 639

[56] References Cited

U.S. PATENT DOCUMENTS

| | | | |
|---|---|---|---|
| 3,673,694 | 7/1972 | Adam et al. | 33/637 |
| 3,781,999 | 1/1974 | Colangelo | 33/639 |
| 4,319,400 | 3/1982 | Chung | 33/639 |
| 4,425,061 | 1/1984 | Kindl et al. | 408/6 |
| 4,433,488 | 2/1984 | Baumgartner | 33/637 |
| 4,761,101 | 8/1988 | Zettl | 408/6 |
| 5,086,590 | 2/1992 | Athanasiou | 408/6 |
| 5,472,298 | 12/1995 | Mihai | 408/8 |

FOREIGN PATENT DOCUMENTS

| | | |
|---|---|---|
| 0 043 920 | 1/1982 | European Pat. Off. . |
| 0 491 724 B1 | 7/1992 | European Pat. Off. . |
| 31 21 800 A1 | 12/1982 | Germany . |
| 33 30 280 A1 | 4/1984 | Germany . |
| 36 34 068 A1 | 8/1987 | Germany . |
| 40 00 025 C2 | 7/1991 | Germany . |
| 93 14 828.3 | 2/1994 | Germany . |

OTHER PUBLICATIONS

Flugkreisdurchmesser von Werkzeugschneiden bei hohen Drehzahlen automatisch messen, Industrie–Anzeiger, Oct. 1990.

Schneller durch Messen vor Ort, Industrie–Anzeiger 43/1991 May 8, 1991, pp. 112–114 and 119 (4 sheets).

Messgesteuertes Feinbohren, Industrie–Anzeiger 80. Jg. Nr. 73 v. Dec. 9, 1967—S. 1610 Spangebende Formung S. 206 (4 sheets).

*Primary Examiner*—Steven C. Bishop
*Assistant Examiner*—Adesh Bhargava
*Attorney, Agent, or Firm*—Flynn, Thiel, Boutell & Tanis, P.C.

[57] ABSTRACT

The invention relates to a process and device for detecting and/or compensating for static jointing and wear errors in the fine drilling of workpieces by means of an adjusting tool (18) bearing an adjustable cutting insert (28) and capable of being clamped to a machine shaft (14). According to the invention, before a drilling or a series thereof is made, the diameter of the circle of travel of a radially outer cutting edge (44) of the cutting insert (28) is measured on the clamped adjusting tool with the machine shaft (14) rotating and evaluated within the adjusting tool (18) for adjustment purposes.

17 Claims, 1 Drawing Sheet

PROCESS AND DEVICE FOR DETECTING AND COMPENSATING FOR JOINTING AND WEAR ERRORS IN FINE DRILLING

FIELD OF THE INVENTION

The invention relates to a process and a device for detecting and/or compensating for jointing and wear errors in the fine drilling of workpieces by means of an adjusting tool bearing an adjustable cutting insert and capable of being clamped to a machine shaft.

BACKGROUND OF THE INVENTION

In the machining of workpieces in machining centers a number of successive operations are performed, starting with reaming and ending with fine drilling.

The required tools are for the most part interchanged automatically. During the interchange, errors of greater or lesser magnitude occur statistically which can be attributed to various causes:

When the tool is being attached to the cutting position on the machine shaft a displacement of the axle or a faulty angle setting (tilting) may occur between the machine axle and the axle of the adjusting tool.

A similar faulty axle or angle setting may occur at other disconnecting points of the tool.

Errors can also be caused by dirt at the cutting positions and disconnecting points.

When the cutting inserts are being clamped in position or the cutting parts are being fixed in their carriers the clamping or fixing may be faulty.

In addition, systematic wear errors occur and cause a gradual reduction of the drilling diameter. Especially in soft workpieces, a built-up edge may form which is due to the deposit of metallic particles on the edge during machining, with a resulting change in the edge's geometry. In addition, there are fatal errors which make it necessary to replace a tool, such as breaking of the edge and cutting inserts being left out of the tool components or coming loose from them.

All these errors produce variation in both the drilling diameter and in the quality of the drilling. Previously there was no easy way of detecting these errors before machining had actually taken place. This is particularly true of jointing and tolerance errors which do not exceed certain limits of accuracy. These errors could only be detected by checking the results of the drilling (post-process checking), for example, by the use of sensors to measure the workpiece directly, and were the cause of undesirable defective goods.

It is moreover known with respect to precision-adjustment heads (EP-B 0 491 724) how to adjust the radius of a cutting edge at the toolhead to a set predetermined drilling diameter within a tolerance range either manually or, for example, by means of an adjustment motor. The potential accuracy of precision-adjustment heads could not be fully accounted for by the statistically occurring errors, especially in machining centers.

In the light of the foregoing, the purpose of the invention is to develop a process and a device which will make it possible to detect and compensate for statistical jointing and wear errors in fine drilling before the process starts.

In claims 1 and 13 combinations of characteristics are proposed for the accomplishment of this purpose. Advantageous embodiments and additional forms of the invention will be found in the subclaims.

SUMMARY OF THE INVENTION

The basis for accomplishing the purpose of the invention is the principle that the diameter of the circle of travel of a radially outermost cutting edge of the cutting insert is measured on the clamped adjusting tool and evaluated for adjustment purposes within the adjusting tool before a fine drilling or series of fine drillings is performed with the adjusting tool. The determination of the diameter of the circle of travel is for practical purposes accomplished by measuring the positions of tangents at two diametrically opposite points on the circle of travel of the cutting edge rotating around the machine shaft and setting them at a distance in relation to each other or to fixed zero positions. The positions of the tangents can also be measured by measuring the displacement at two parallel contact surfaces which are diametrically opposite to each other in relation to the axis of the machine shaft and can be moved transversely to the axis by the action of the cutting edge as it revolves past them, while to prevent damage to the contact surface the adjusting tool is rotated past the contact surface counter the cutting direction of its cutting insert.

It is also entirely possible to determine the tangent positions without contact, preferably by a laser scan of the cutting edge as it revolves in the direction of the tangents.

The errors detected by determining the diameter of the circle of travel can be compensated for manually or automatically by comparing the measured diameter of the circle of travel with a desired value fitted to a predetermined drilling diameter and adjusting the cutting insert on the adjusting tool to the variation between actual and desired values radially, preferably around half the extent of the variation and in the same direction. Fully automated compensation is possible if the measured tangent positions are evaluated in a computer by comparison of the actual and desired values, and are, for the purpose of adjusting an adjustment mechanism, bearing the cutting edge sent to the adjusting tools preferably by wireless transmission, for example, via an infrared data transmission path.

In order to make it possible to detect the gradual wear on the cutting inserts and to compensate for it, an advantageous embodiment of the invention provides for the diameter of the circle of travel to be measured several times during a series of drillings, and to be evaluated for adjustment and recording purposes. This also makes it possible to undertake statistical quality control and to check on wear.

Before executing an initial fine drilling, it is useful to make a test drilling in a test piece and to measure it in order to calibrate the desired value for the purpose of comparing actual and desired values at a later time. During a series of drillings, especially before or after a check on or an adjustment of the diameter of the circle of travel, sample measurements can also be taken of the drillings in the workpieces or a test piece and can be evaluated for the purpose of recalibrating the desired value.

In the event of fatal errors, which can be detected, for example, when a predetermined tolerance range (contact limits) in the measured diameter of the circle of travel is not met or is exceeded, machining can be stopped and an error message appears.

In a preferred device for executing the process in accordance with the invention, a measuring apparatus fixed to the frame is positioned within the operating area of the adjusting tool and can be used to determine the diameter of the circle of travel of a radially outer cutting edge of the cutting insert of the adjusting tool which is clamped on the machine shaft and rotates around its axis. It is useful for the measuring apparatus to have two sensors or feelers with a space between them to detect in relation to the frame the positions of two diametrically opposite and parallel tangents to the circle of travel of the outer edge of the cutting insert rotating around the axis of the machine shaft. For this purpose, it is useful to provide two plan parallel contact heads facing their contact surfaces, these heads being each capable of limited movement in a slide fixed to opposite sides of the frame against the force of a return spring and connected to an path-measuring system which records the path of the displacement, while between the contact heads there is a clear space for receiving the part of the adjusting tool clamped on the machine shaft which bears the cutting insert, the spindle axis being set parallel to the contact surfaces. The dimensions of the clear space must be such that the distance between the contact surfaces is smaller than the diameter of the circle of travel but larger than the diameter of a shaft bearing the cutting insert. To prevent damage to the contact heads, the adjusting tool engaging in the clear space can be rotated around the machine shaft axis in a direction opposite to the direction of cutting.

It is useful for the path-measuring systems to include an inductive, capacitive or optical gauge and preferably an analog/digital converter for connection to an I/O card in a computer. For fully automated compensation for jointing and wear errors, it is practical to use an adjusting tool with, for example, an adjustment mechanism for the cutting insert which can be mechanically powered and preferably has wireless communication with the computer. The adjusting tool may, for example, take the form of a finely adjustable drill head or a facing head.

BRIEF DESCRIPTION OF DRAWINGS

The invention is explained below in detail on the basis of a sample embodiment shown diagrammatically in the drawing. The single FIGURE shows a diagram of a device for measuring and automatically compensating for jointing and wear errors in a finely adjustable head intended for fine drilling.

DETAILED DESCRIPTION

Figure 1:
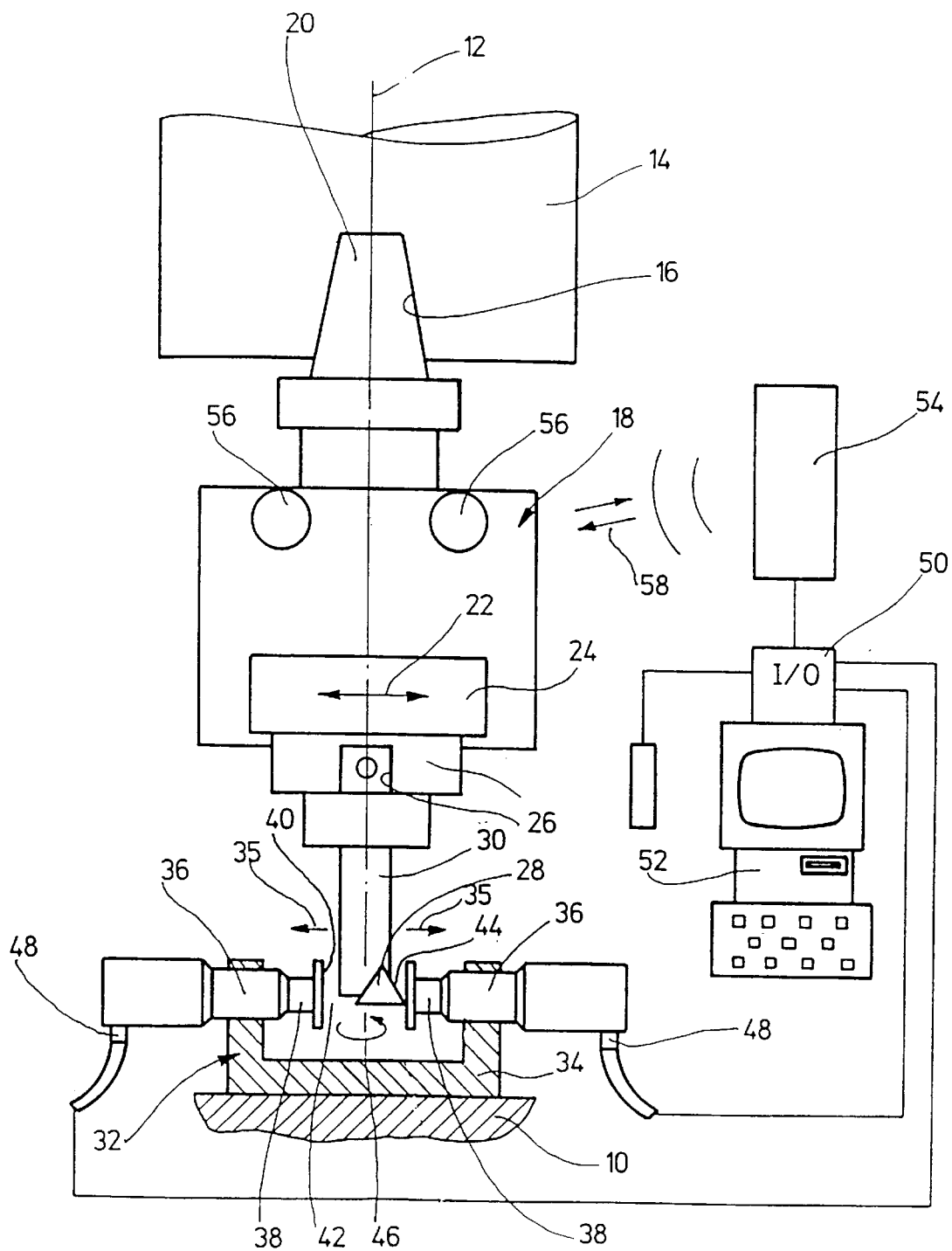

The drawing shows a cutaway of a machining center 10 with a machine shaft 14 which can be raised and lowered and moved within the machining center 10 and can be rotated around the shaft axis 12, and a tool carrier 16 to which machine tools 18 can be clamped by a clamping mechanism which in the sample embodiment shown comprises a steep taper shank 20. The machining tool 18 is a finely adjustable drill head with a slider 24 which can be moved mechanically in the direction of the double arrow 22, the slider 24 having a tool carrier 26 for a drill rod 30 equipped with a cutting insert 28. When the drill head 18 is attached in the steep taper carrier 16 of the machine shaft 14 and the drill rod 30 is attached in the carrier 26 of the adjustment head 18 jointing errors may occur which can result in the cutting insert 28 changing its position relatively to the shaft axis 12 and consequently causing a change in the drilling diameter produced by the cutting insert. The gradual wear on the cutting insert 28 can also lead to errors in the drilling diameter. In addition, fatal errors can occur through breaking or loosening of the cutting insert 28.

In order to detect errors of this kind and to compensate for them where necessary with the adjustment mechanism 24 which is already available, a measuring device 32 is installed in the operating area of the tool 18 clamped on the shaft 14, with a support 34 fixed to the frame and two sensors 38 which are capable of limited movement on the U-shaped arms of the support 34 in the direction of the arrow 35 in guides 36 fixed to the frame against the force of a spring, which is not shown. The sensors 38 are set parallel to each other at their facing contact surfaces 40 and at that point bound a clear space 42 into which the adjusting tool 18 with its drill rod 30 and the cutting insert 28 can be completely pushed into from above. The dimensions of the clear space 42 in the innermost final position of the sensors 38 are such that the distance between the contact surfaces 40 is greater than the diameter of the drill rod 30 but smaller than the diameter of the circle of travel of the outermost cutting edge 44 of the cutting insert 28 when the tool is rotating around the shaft axis 12 in the direction of the arrow 46. In each slide 36 there is a preferably inductive path-measuring system, not shown, which can be used to measure the displacement of the sensor 38 and to output it in the form of electrical position signals at the outputs 48. When the tool rotates, the sensors 38 are pushed outwards by the outer edge 44 of the rotating cutting insert rotating oppositely the cutting direction of the cutting edge 28 in the direction of the arrow 35 against the force of the return positioning spring and are then moved back inwards by the return positioning spring. In this way we obtain, in the maximum displacement position of the sensors 38, the positions of two diametrically opposite tangents to the circle of travel of the outermost edge 44 of the cutting insert, and from these a measurement for the diameter of the circle of travel is found by subtraction. The use of an appropriate intelligent electronic sensor unit already makes it possible to evaluate the measurements of the positions of the sensors 38 to the point where only the maximum positions of the sensors 38 are given out in digital form at the outputs 48.

The outputs 48 of the sensors 38 are in the sample embodiment conveyed via an I/O card to a computer in which the position data are converted by a suitable program into data for controlling the shift mechanism 24 of the adjustment head 18. For the transmission of data from the computer 52 to the adjustment head 18, a transceiver 54 on the computer and a transceiver 56 on the adjustment head are provided which communicate via an infrared data transmission path 58. The signals transmitted via the infrared path 58 are used for remotely controlling the adjustment mechanism 24. The adjustment mechanism 24 in turn includes an internal path-measuring system from which measurement data are transmitted back to the computer via the infrared path 58 for direct measurement and setting of the displacement of the adjustment mechanism 24.

In general, it is possible when an adjustment mechanism does not have an internal path-measuring system to set the displacement and adjustment movements by reading the momentary actual values of the displacement sequentially on the measuring device 32 during the adjustment procedure and operating the adjustment mechanism to correct the given difference between actual and desired values.

The arrangement described makes it possible to detect with the measuring device 32 jointing errors and wear errors on the cutting insert 28 that occur when the measuring head 18 and the drill rod 30 are being clamped on to a machine shaft and to effect compensation via the adjustment mechanism 24.

In order to prevent dirt and the measuring errors it causes, it is useful to place the measuring device 32 located within the machining center in a casing which can be closed by a removable lid or a brush cap.

The invention may be summarized as follows: it relates to a process and a device for detecting and/or compensating for statistical jointing and wear errors in the fine drilling of workpieces by means of an adjusting tool 18 bearing an adjustable cutting insert 28 and capable of being clamped to a machine shaft 14.

According to the invention, before a drilling or series of drillings is made, the diameter of the circle of travel of a radially outer cutting edge 44 of the cutting insert 28 is measured clamped on the adjusting tool with the machine shaft 14 rotating and evaluated on the adjusting tool 18 for adjustment purposes.

The embodiments of the invention in which an exclusive property or privilege is claimed are defined as follows:

1. A detection and compensation process for jointing and wear errors in the fine drilling of workpieces, comprising the steps of: clamping an adjusting tool supporting a radially adjustable cutting insert to a rotatable machine shaft, measuring a diameter of the circle of travel of a radially outer cutting edge of the cutting insert with the machine shaft rotating, and evaluating the measured diameter within the adjusting tool for adjustment purposes before a drilling process is executed with the adjusting tool, and the diameter of the circle of travel measuring step includes (1) positioning tangents at two diametrically opposite positions on the circle of travel of the cutting edge, (2) setting the tangents at a distance in relation to each other or to fixed zero positions, and (3) measuring the distance between the tangents, wherein the positions of the tangents are found by measuring relative displacement of two parallel contact surfaces diametrically opposite to each other in relation to the axis of the machine shaft, moving the contact surfaces transversely to the axis by the action of the rotating cutting edge, and rotating the adjusting tool past the contact surfaces counter to the cutting direction of the cutting insert.

2. The process as in claim 1, further comprising the step of comparing the measured diameter of the circle of travel to a desired value corresponding to a predetermined drilling diameter and adjusting the cutting insert radially to a variation found between the actual measured and desired diameters by half the the variation in one radial direction.

3. The process as in claim 1, further comprising the steps of evaluating the measured positions of the tangents in a computer for comparison of the measured value and a desired value corresponding to a predetermined drilling diameter, converting the digital computer signal into an infrared signal, sending the infrared signal to the adjusting tool by a wireless infrared data transmission path for the purpose of effecting the adjustment of an adjusting mechanism supporting the cutting insert.

4. The process as in claim 1, further comprising the step of repeating both the measuring step and evaluating step on the diameter of the circle of travel at least once during a series of drillings for readjusting the cutting insert.

5. The process as in claim 1, further comprising the step test drilling a test workpiece before an initial fine drilling is performed, and measuring the test drilling to permit calibration of the desired value for the purposes of the comparison between actual measured and desired values.

6. The process as in claim 5, further comprising the step of measuring the drillings made by the cutting insert during a series of drilling operations.

7. The process according to claim 6, further comprising the step of measuring the drillings before and after each adjustment of the cutting insert.

8. A process as in claim 6, further comprising the step of recalibrating the desired value for the comparison between actual measured and desired values according to the variations from a predetermined drilling diameter.

9. A process as in claim 1, further comprising the steps of displaying an error message and stopping machining if a predetermined tolerance range in the diameter of the circle of travel is exceeded.

10. A device for determining and compensating for statistical jointing and wear errors in fine drilling comprising, a frame, an adjustment tool clamped on a rotatable machine shaft, a radially adjustable cutting insert mounted on the adjustment tool and having a radially outer cutting edge, and a measurement apparatus fixed to the frame adjacent an operating area of the adjusting tool for determining a diameter of the circle of travel of the radially outer cutting edge when rotating the machine shaft, wherein the measuring apparatus has two parallel sensors which respectively have contact surfaces facing each other, a slide slidably fixed to the frame and supporting the contact surfaces for limited movement, a reverse spring connected to the slide for urging the slide to an initial position, a path-measuring system connected to the parallel sensors for determining the path of displacement, and the sensors defining a clear space therebetween for receiving a part of the adjusting tool which supports the cutting insert, the contact surfaces being parallel to the axis of the shaft, and the adjusting tool in the clear space being rotated around an axis of the shaft in a direction opposite to the cutting direction.

11. The device as in claim 10, further comprising an evaluation control for radially adjusting the cutting insert on the adjusting tool to the variation of the measured diameter of the circle of travel from a desired value defining a predetermined drilling diameter.

12. A device as in claim 10, wherein the dimensions of the clear space are such that the distance between the contact surfaces is smaller than the diameter of the circle of travel but larger than the diameter of a shaft supporting the cutting insert.

13. The device as in claim 10, wherein the path-measuring system has one of an inductive, capacitive and optical gauge, and has an analog/digital converter for connection to an I/O card of a computer.

14. The device as in claim 13, wherein the adjusting tool has an adjustment mechanism for the cutting insert which is mechanically powered and is subject to wireless control from the computer.

15. The device as in claim 10, wherein the adjusting tool is one of a finely adjustable drill head and a facing head.

16. The process according to claim 1, further comprising the step of repeating the measuring and evaluating steps at least once during a series of drilling operations for recording the position of the cutting insert.

17. In a machining device having a rotatable drive shaft and a frame, the shaft being rotatable in a first cutting direction and in a second noncutting direction, an adjustment tool clamped on the shaft, a cutting device supported by the adjustment tool, the cutting device being radially positioned by the adjustment tool and having a radially outward cutting edge for machining a workpiece, a cutting edge position determining device comprising:

a support movably mounted on the frame, first and second parallel sensors mounted on the support, the first and second sensors respectively having contact surfaces spaced apart for receiving the cutting device therebetween, the first and second sensors producing position signals in response to contact by the cutting edge onto the contact surfaces with the shaft rotating in the noncutting direction, and a measuring system connected to the first and second sensors for receiving the position signals, the measuring system having means for comparing the position signals to a desired position of the cutting edge, and the measuring system being connected to the adjustment tool to control adjustment of position of the cutting edge in response to the means for comparing.

* * * * *